(12) United States Patent
Coombe et al.

(10) Patent No.: US 8,793,696 B2
(45) Date of Patent: Jul. 29, 2014

(54) DYNAMIC SCHEDULING FOR FRAMES REPRESENTING VIEWS OF A GEOGRAPHIC INFORMATION ENVIRONMENT

(75) Inventors: Gregory William Coombe, San Francisco, CA (US); Jeremy Paul Erickson, Chapel Hill, NC (US)

(73) Assignee: Google, Inc., Mountain View, CA (US)

( * ) Notice: Subject to any disclaimer, the term of this patent is extended or adjusted under 35 U.S.C. 154(b) by 398 days.

(21) Appl. No.: 13/272,721

(22) Filed: Oct. 13, 2011

(65) Prior Publication Data
US 2013/0097606 A1 Apr. 18, 2013

(51) Int. Cl.
*G06F 9/46* (2006.01)

(52) U.S. Cl.
USPC .......................................... 718/102; 718/107

(58) Field of Classification Search
None
See application file for complete search history.

(56) References Cited

U.S. PATENT DOCUMENTS

| | | | |
|---|---|---|---|
| 5,628,013 A * | 5/1997 | Anderson et al. | 718/107 |
| 7,233,584 B2 * | 6/2007 | Nguyen et al. | 370/337 |
| 7,234,126 B2 * | 6/2007 | Catthoor et al. | 716/104 |
| 7,668,170 B2 * | 2/2010 | Deshpande | 370/394 |
| 7,756,102 B2 * | 7/2010 | Aceves | 370/348 |
| 2008/0165797 A1 * | 7/2008 | Aceves | 370/458 |
| 2010/0166081 A1 * | 7/2010 | Onoye et al. | 375/240.25 |

* cited by examiner

*Primary Examiner* — Van Nguyen
(74) *Attorney, Agent, or Firm* — Dority & Manning, P.A.

(57) ABSTRACT

An exemplary method for scheduling jobs in frames representing views of a geographic information environment is disclosed. An exemplary method includes determining a remaining frame period in a frame representing a view of a geographic information environment. The exemplary method also includes identifying a dynamic job in a scheduling queue. The dynamic job has a non-preemptive section that is between a start of the job and a preemption point of the job. The exemplary method further includes determining an estimated execution time for executing the job. When the estimated execution time is not greater than the remaining frame period, the exemplary method includes executing the non-preemptive section of the job in the frame. When the estimated execution time is greater than the remaining frame period, the exemplary method includes postponing the execution of the job in the frame.

25 Claims, 10 Drawing Sheets

```
class IJobScheduler {
  void AddJob(Job*);
  void RunJobs();
  bool ShouldContinue(Job*);

class Job {
    bool Run();
    TaskID GetTaskID();
  };

class TimePredictor {
    double Predict(TaskID);
    void RecordExecutionTime(TaskID,
                             time);
  };
};
```

FIG. 6

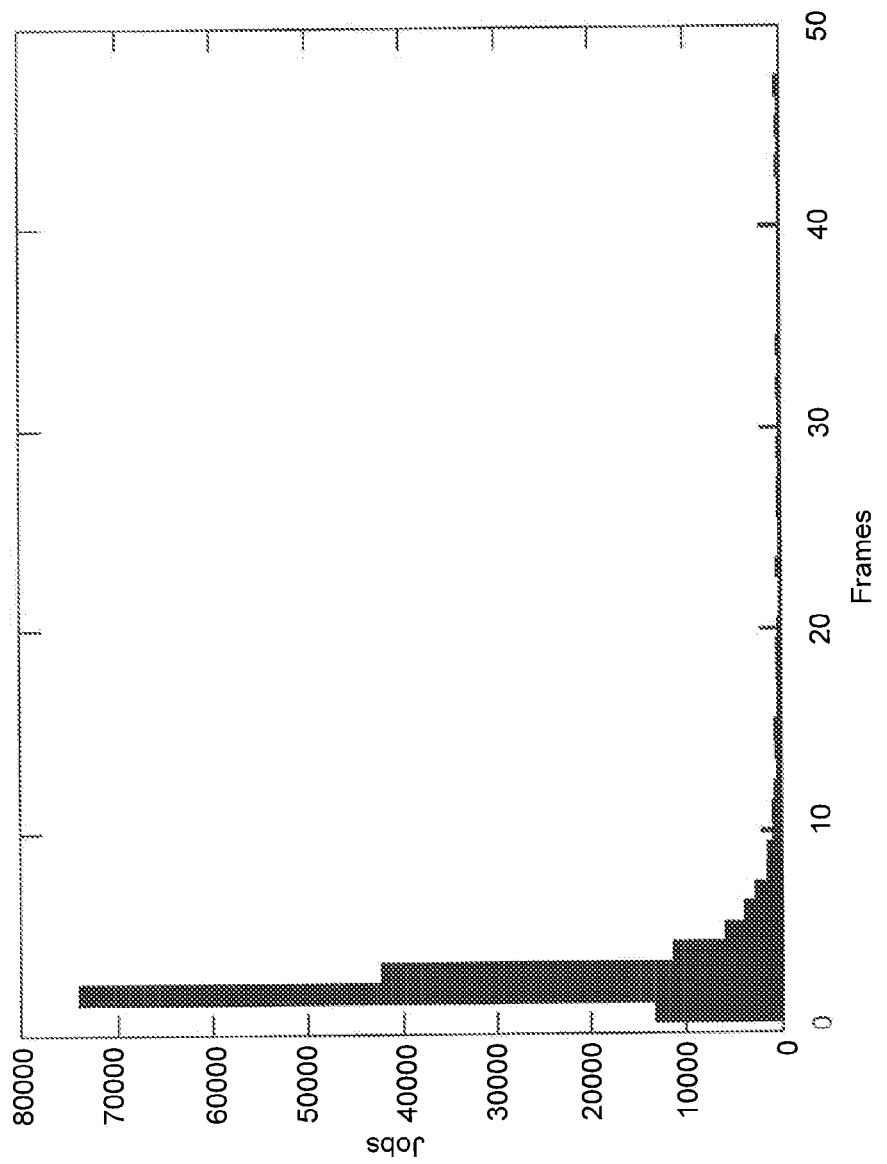

| Technique | Platform | Missed Firm Deadlines | Worst Median (Within Task) Response | Average Response | Worst Response |
|---|---|---|---|---|---|
| 6.0 Emulation | Windows | 3260 | 3 | 4.4 | 107 |
| 6.0 Emulation | OSX | 3164 | 2 | 6.5 | 220 |
| No Scheduler Prediction | Windows | 3190 | 3 | 5.2 | 107 |
| No Scheduler Prediction | OSX | 2919 | 2 | 4.0 | 372 |
| 6-Second Maximum | Windows | 351 | 3 | 11.7 | 193 |
| 6-Second Maximum | OSX | 1072 | 2 | 7.6 | 741 |
| 30-Second Maximum | Windows | 141 | 3 | 28.2 | 760 |
| 30-Second Maximum | OSX | 614 | 3 | 9.8 | 619 |
| Non-Expiring Maximum | Windows | 64 | 30 | 16.6 | 16006 |
| Non-Expiring Maximum | OSX | 8 | 8126 | 270.5 | 237 |
| 95% Histogram | Windows | 992 | 3 | 8.6 | 357 |
| 95% Histogram | OSX | 1062 | 2 | 14.7 | 439 |
| 99% Histogram | Windows | 638 | 3 | 12.8 | 209 |
| 99% Histogram | OSX | 417 | 3 | 7.3 | 112 |
| Mean + 2 Standard Deviations | Windows | 842 | 3 | 4.4 | 67 |
| Mean + 2 Standard Deviations | OSX | 887 | 2 | 3.5 | 103 |
| Mean + 3 Standard Deviations | Windows | 257 | 3 | 4.7 | 110 |
| Mean + 3 Standard Deviations | OSX | 450 | 2 | 4.1 | 107 |
| Mean + 4 Standard Deviations | Windows | 198 | 3 | 3.7 | 98 |
| Mean + 4 Standard Deviations | OSX | 581 | 2 | 3.8 | 317 |
| Mean + 6 Standard Deviations | Windows | 173 | 3 | 6.6 | 283 |
| Mean + 6 Standard Deviations | OSX | 552 | 3 | 3.8 | |

FIG. 9

DYNAMIC SCHEDULING FOR FRAMES REPRESENTING VIEWS OF A GEOGRAPHIC INFORMATION ENVIRONMENT

BACKGROUND

1. Field

This disclosure generally relates to scheduling algorithms.

2. Background

A geographic information system (GIS) is a system for archiving, retrieving, displaying, or manipulating data indexed according to the data elements' geographic coordinates. The data elements may be a variety of data types such as satellite imagery, maps, models of buildings and terrain, and other geographic features. The GIS may allow a user to navigate around a virtual globe and view satellite imagery, terrain, three-dimensional buildings, and geo-spatial content in a geographic information environment at a display of a device. A GIS application communicates with a server to retrieve data that is requested for display on a client device. When displaying content, the GIS application may have a significant amount of visible stutter. When a user navigates the globe, a user's experience may be more enjoyable when content is displayed quickly and smoothly.

BRIEF SUMMARY

This disclosure generally relates to scheduling jobs to be executed in frames representing views of a geographic information environment. An exemplary method for scheduling jobs in frames representing views of a geographic information environment includes determining a remaining frame period in a frame representing a view of the geographic information environment. The remaining frame period is a time period after executing a set of fixed jobs in the frame and at a frame boundary of the frame. The exemplary method also includes identifying a dynamic job in a scheduling queue. The dynamic job has a non-preemptive section that is between a start of the job and a preemption point of the job. The exemplary method further includes determining an estimated execution time for executing the job. The exemplary method also includes when the estimated execution time is not greater than the remaining frame period, executing the non-preemptive section of the job in the frame. The exemplary method further includes when the estimated execution time is greater than the remaining frame period, postponing the execution of the job in the frame.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

FIG. 6 shows exemplary code for a scheduling interface.

FIG. 8 shows a perceived response histogram, according to an embodiment.

FIG. 9 shows a table of a technique used to estimate the execution time of jobs, according to an embodiment.

DETAILED DESCRIPTION

Figure 1:
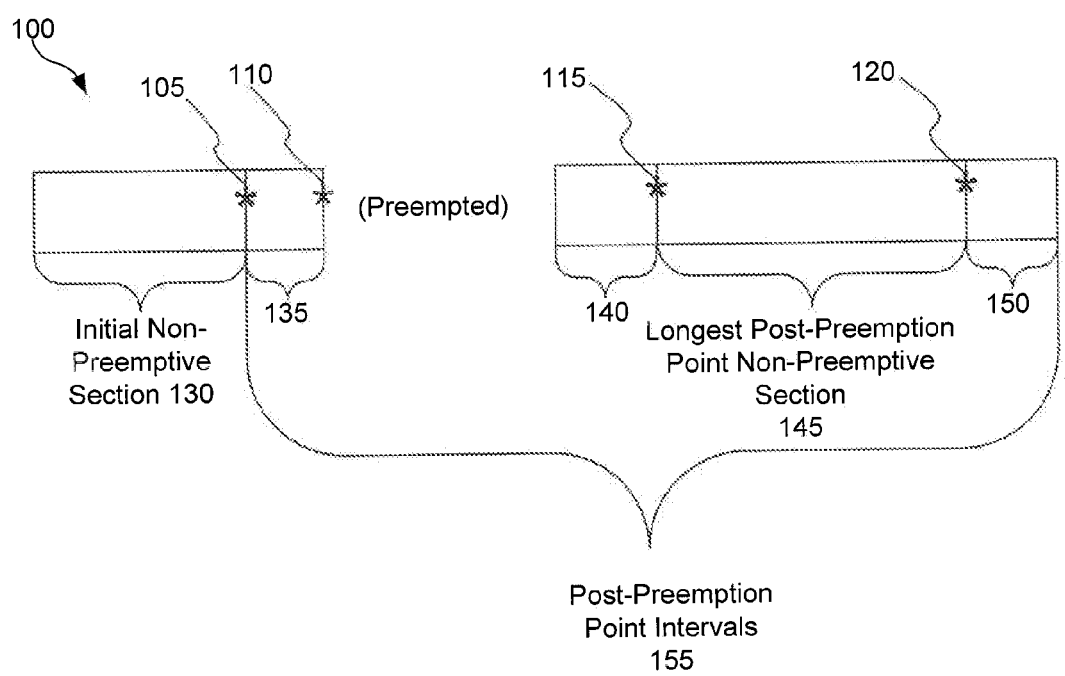
FIG. 1 shows a diagram illustrating a dynamic job having explicit preemption points, according to an embodiment.

I. Overview
II. Jobs Executed in Frames
   A. Preemption Points in a Job
   B. Schedule Jobs
   C. Threads
III. Frames Representing a View in a Geographic Information Environment
   A. Execute Fixed Tasks
   B. Execute Dynamic Tasks
      1. Single-Active Sporadic Tasks and Soft Real-Time Aperiodic Tasks
      2. Update a view of a Geographic Information Environment
   C. Vertical Synchronization
IV. Exemplary System Architecture
   A. Scheduling System
      1. Estimated Execution Time is Not Greater than the Remaining Frame Period
      2. Estimated Execution Time is Greater Than the Remaining Frame Period
   B. Scheduling Tasks in a Geographic Information Environment
V. Exemplary Method For Scheduling Jobs in Frames Representing Views of a Geographic Information Environment
VI. Scheduling
   A. Scheduling Queue
   B. Example Scheduling Interface
   C. Estimate Execution Time
VII. Conclusion

I. Overview

This disclosure generally relates to scheduling and executing jobs in frames based on a scheduling algorithm.

An image rendered at a display device is called a frame. A frame may represent a view of a geographic information environment. A number of fixed and dynamic jobs may be executed in the frame within the frame's frame period. A frame period includes a time period between a start of the frame and a frame boundary of the frame. The frame boundary represents an end of the frame. When a job executes and passes over the frame boundary, the rendering process slices and the user effectively sees the same frame rendered twice. Accordingly, the frame stutters, resulting in a less than enjoyable user experience.

Methods, systems, and computer program products are provided for scheduling jobs in frames representing views of a geographic information environment. This disclosure describes scheduling algorithms that may reduce the number of jobs passing over the frame boundary, reducing frame stutter. If it is likely that a job will pass over the frame boundary, the execution of the job may be postponed to a subsequent frame. Aspects may be particularly beneficial for geographic information clients having limited computing resources, such as a mobile device.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

II. Jobs Executed in Frames

An image rendered at a display device is called a frame. The rendering may be divided into equal-size frame periods. A frame period may depend on such factors as the operation of the graphics hardware and display devices. A vertical synchronization event occurs when the display device reads data from a frame buffer. This read is synchronized to the update rate of the display device. For example, if a display device's update rate is set to 60 Hertz, the frame periods of the frames are 16.67 milliseconds in length.

There may not be a benefit to rendering faster than the update rate. Rendering slower than the update rate, however, may introduce artifacts by redrawing the previous frame, causing a noticeable frame stutter. Real-time scheduling mechanisms may be used to reduce frame stutter.

A. Preemption Points in a Job

A single frame representing a view of a geographic information environment is created by executing a number of jobs in the frame. Jobs may be entirely in a user-level program. In a user-level program, kernel scheduling primitives may be inaccessible and a job may not be arbitrarily stopped and switched to execute another job. To alleviate this issue, preemption points can be built into jobs, resulting in reduced frame stutter.

Further, a modern graphics application may run on multiple platforms, operating systems, and systems from, for example, desk-top computers to smartphones. Due to this diversity, it may be difficult to estimate an execution time for running a job. For example, different systems may have different cache and processor speeds. Accordingly, many offline analysis of execution time of jobs is impractical. Further, to preserve the sense of fluid motion through a three-dimensional environment, the application may render at a display device's update rate (e.g., 60 Hertz).

A scheduler schedules jobs for execution and executes the jobs in a frame. A job may include at least one preemption point. A preemption point of a job is a point during execution at which it is safe for the job to stop and return control to the scheduler. In an embodiment, when the preemption point is reached, a job invokes the scheduler. For example, when a preemption point is reached, the job can make a call to the scheduler to determine whether it should continue executing. The scheduler may determine whether to continue executing the job in the frame or whether to postpone the job from executing in the frame based on an estimated execution time for executing the job.

In an embodiment, the scheduler has prior knowledge of when preemption points occur in the job. In another embodiment, the scheduler does not have prior knowledge of when preemption points occur in the job.

FIG. 1 shows a diagram illustrating a dynamic job 100 having explicit preemption points 105, 110, 115, and 120, according to an embodiment. Job 100 can be divided into non-preemptive sections based on its preemption points. A job contains one initial non-preemptive section, zero or more post-preemption point non-preemptive sections, and a longest post-preemption point non-preemptive section.

A job can have two non-preemptive section types. A first non-preemptive section type can be an initial non-preemptive section that is between a start of the job and its first preemption point. For example, job 100 has an initial non-preemptive section 130 that is between a start of job 100 and preemption point 105.

A second non-preemptive section type can be a post-preemption point non-preemptive section. The post-preemption point non-preemptive sections are the zero or more non-preemptive sections after the initial non-preemptive section. These post-preemption point non-preemptive sections can be between two preemption points of the job or between a preemption point of the job and an end of the job. For example, job 100 has post-preemption point non-preemptive sections 135, 140, 145, and 150. A post preemption point interval 155 includes post-preemption point non-preemptive sections 135, 140, 145, and 150. Post-preemption point non-preemptive sections 135, 140, 145 are each between two preemption points of job 100, and post-preemption point non-preemptive section 150 is between a preemption point of job 100 and an end of job 100.

Within the set of post-preemption point non-preemptive sections of a job, the longest (or an arbitrary longest in case of a tie) may be referred to as the longest post-preemption point non-preemptive section. Post-preemption point non-preemptive section 145 is the longest post-preemption point non-preemptive section in job 100.

Execution of job 100 may safely stop at preemption points 105, 110, 115, and 120 and later resume execution at the point in which job 100 stopped. In an example, a scheduler executes job 100, resulting in initial non-preemptive section 130 of job 100 being executed. At preemption point 105, job 100 stops executing and saves its state. Job 100 calls the scheduler to determine whether job 100 should continue to execute. The scheduler determines whether to continue executing job 100 or stop executing job 100 at preemption point 105. In FIG. 1, the scheduler continues to execute job 100, resulting in the execution of job 100 resuming from preemption point 105. Accordingly, post-preemption point non-preemptive section 135 is executed.

At preemption point 110, job 100 stops executing and saves its state. Job 100 calls the scheduler to determine whether job 100 should continue to execute. The scheduler determines whether to continue executing job 100 or stop executing job 100 at preemption point 110. In FIG. 1, the scheduler stops executing job 100 during the preempted interval. During this interval, the scheduler may execute zero or more jobs. At a later point in time, the schedule resumes execution of job 100, resulting in post-preemption point non-preemptive section 140 being executed. This process may continue until job 100 finishes executing.

B. Schedule Jobs

A job is released when it is added to a scheduling queue for execution. The scheduler can identify potential jobs in the scheduling queue to execute. The scheduler may select particular jobs for execution in a frame depending on factors such as a remaining frame period in which to execute a dynamic jobs and an estimated execution time for executing the job.

A job may be associated with a task. A task may have a deadline. A soft deadline is a deadline that can be missed but should be missed by the smallest amount possible. Value still exists in completing a job after its soft deadline has passed. A firm deadline is a deadline after which a job should not be completed but should instead be discarded. Missing a firm deadline is costly, but not catastrophic.

In an embodiment, all jobs released within a single frame have the same deadline at the next frame boundary. The scheduler may attempt to finish a task before the vertical synchronization time rather than scheduling the vertical synchronization task alongside other work, due to the firm deadline of that task.

In an embodiment, the scheduler does not execute a job that the scheduler expects to cause a deadline miss and stops executing a job if the deadline is actually missed. The execution of a job in a frame may exceed the frame boundary of the frame, resulting in a frame stutter. If it is determined that the execution of a job has exceeded the frame boundary of the frame, the scheduler may stop the execution of the job in the frame. The scheduler may schedule the job for execution in a subsequent frame and may execute the job in the subsequent frame.

Figure 2:
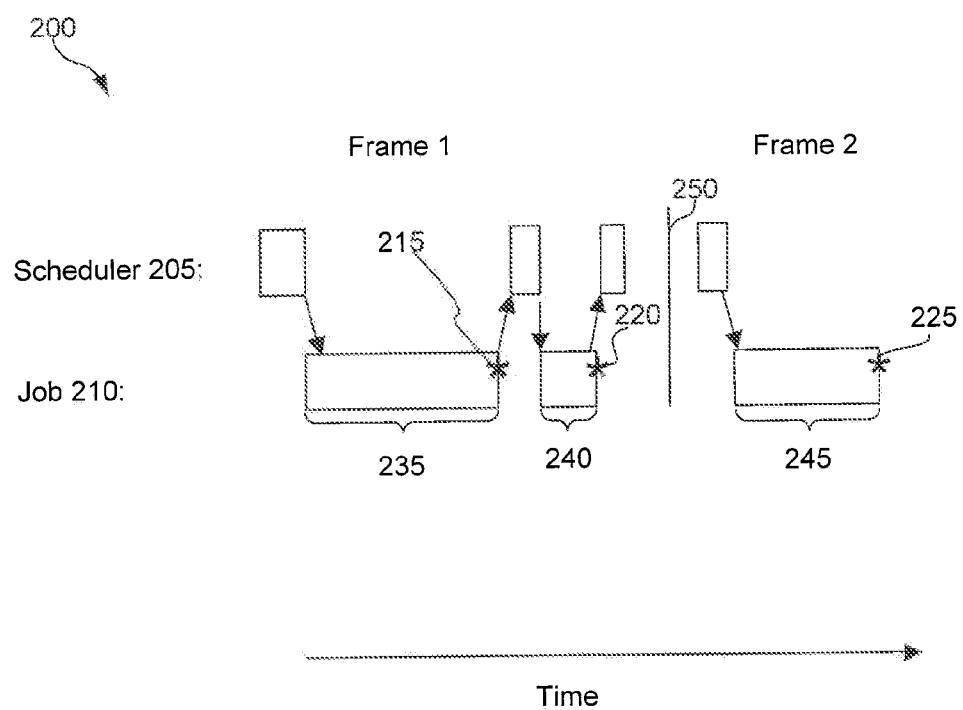
FIG. 2 shows a diagram illustrating a scheduler executing a dynamic job in two different frames, according to an embodiment.

FIG. 2 shows a diagram 200 illustrating a scheduler 205 executing a dynamic job 210 in two different frames, according to an embodiment. Job 210 has preemption points 215, 220, and 225. Scheduler 205 determines whether to execute job 210 in Frame 1 or whether to postpone job 210 from executing in Frame 1. Scheduler 205 may use online prediction to determine whether to execute job 210 in Frame 1. In an embodiment, scheduler 205 identifies job 210 in a scheduling queue and determines an estimated execution time for executing job 210.

Scheduler 205 executes job 210 in Frame 1. When job 1 is executed, non-preemptive section 235 of job 210 effectively executes. At preemption point 215, job 210 makes a call to scheduler 205 to determine whether job 210 should continue to execute. Scheduler 205 determines an estimated execution time for executing job 210.

If job 210 is predicted to finish before the vertical synchronization, scheduler 205 determines that job 210 should continue to execute in Frame 1. Accordingly, scheduler 205 may inform job 210 to continue executing. If, however, job 210 is predicted to not finish before the vertical synchronization, scheduler 205 determines that job 210 should not continue to execute in Frame 1. Accordingly, scheduler 205 may inform job 210 to stop executing. Scheduler 205 may postpone the execution of job 210 until a subsequent frame period (e.g., the next frame period).

In FIG. 2, scheduler 205 determines that job 210 should continue to execute. Accordingly, scheduler 205 executes non-preemptive section 240 of job 210 in Frame 1. At preemption point 220, job 210 makes a call to scheduler 205 to determine whether job 210 should continue to execute.

Scheduler 205 determines whether job 210 should continue to execute. Scheduler 205 may determine an estimated execution time for executing job 210 and determine that if job 210 executes in Frame 1, job 210 will pass the frame boundary and result in a frame stutter. To avoid missing the vertical synchronization deadline, scheduler 205 may determine that job 210 should stop executing and accordingly postpones job 210 from executing in Frame 1. Scheduler 205 informs job 210 to stop executing. Accordingly, job 210 saves its state and returns control to scheduler 205. The postponed non-preemptive section of job 210 is executed in subsequent Frame 2.

During a time period between preemption point 220 and a frame boundary 250, no jobs are executed. Frame boundary 250 can be thought of as the vertical synchronization deadline. Scheduler 205 resumes execution of job 210 in Frame 2, and job 210 resumes execution at a location in which it left off before job 210 was postponed. Accordingly, scheduler 205 executes in Frame 2 job 210 starting at non-preemptive section 245.

C. Threads

A geographic application contains processes that may include multiple threads, each with its own context and execution path. These multiple threads may be part of the same process and share common memory. A first thread started by the operating system and running the main function is the main thread. A worker thread is any thread other than the main thread. In some systems, all direct access to the graphics hardware may take place on the main thread. This may be due to requirements of the graphics drivers on the systems that the geographic application supports.

In an embodiment, all processing executes only on the main thread. In another embodiment, processes may execute on the main thread or worker threads. In an embodiment, different threads may be executed in parallel on different processors.

III. Frames Representing A View In A Geographic Information Environment

Figure 3:
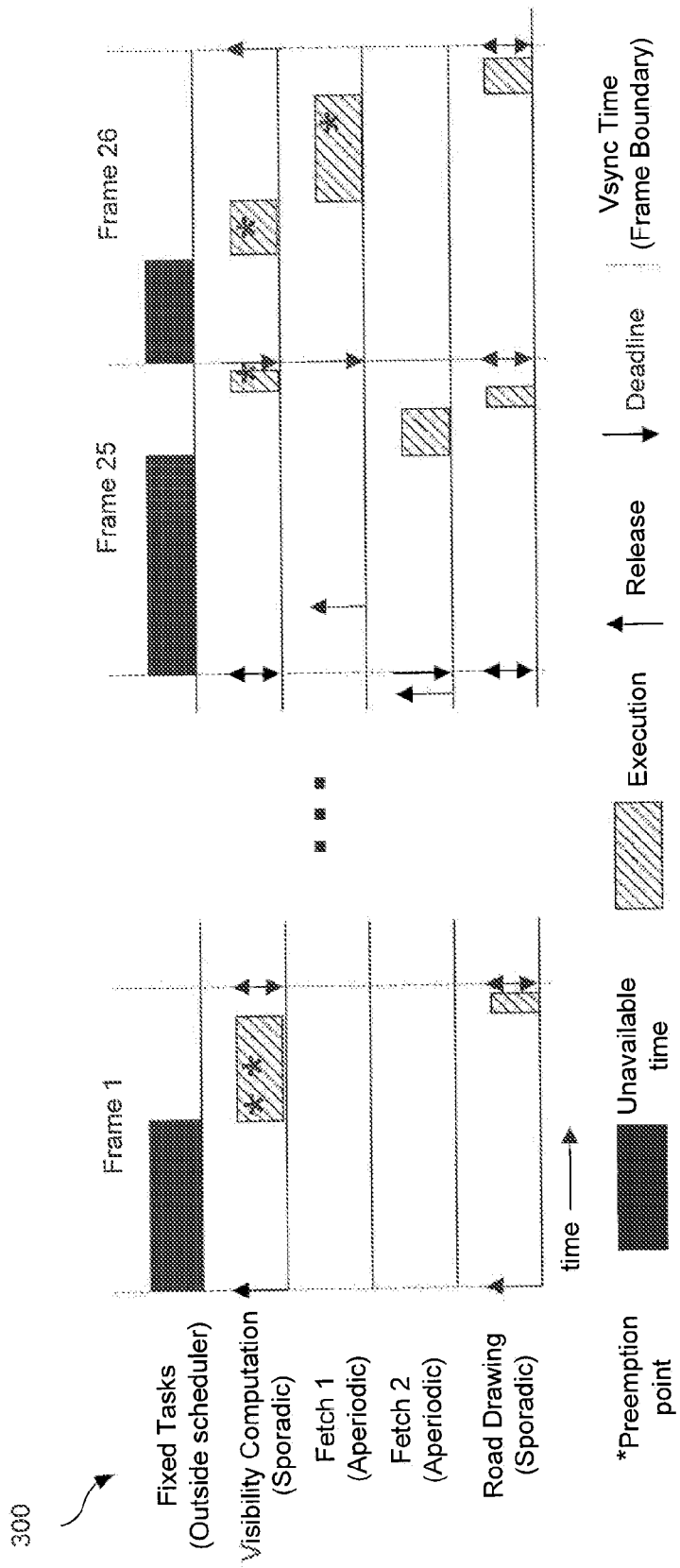
FIG. 3 shows a diagram illustrating fixed and dynamic jobs executing in frames representing a view in a geographic information environment, according to an embodiment.

FIG. 3 shows a diagram 300 illustrating fixed and dynamic jobs executing in frames representing a view in a geographic information environment, according to an embodiment.

Each flame has a frame period. A frame period is the time period between a start of a frame and a frame boundary. A frame has three stages of execution. In an embodiment, a first stage includes executing fixed tasks, a second stage includes executing dynamic tasks, and a third stage includes an occurrence of a vertical synchronization event.

A. Execute Fixed Tasks

In a first stage, fixed tasks are executed. Fixed tasks may run once every frame and may run for a fixed amount of time. In FIG. 3, the fixed tasks are run at a beginning of Frames 1, 25 and 26. The fixed tasks may be executed in a specific order. When fixed tasks take up more of the processing, more computations may be performed and the time period spent executing fixed tasks constitutes unavailable time (shown as solid black bars). Examples of fixed tasks include traversing data structures to perform updates and culling nodes, uploading data to a graphics card, and handling input events.

B. Execute Dynamic Tasks

In a second stage, dynamic tasks are executed. Once the fixed tasks are completed, the rest of the frame period may be dedicated to dynamic tasks that can be scheduled for execution by the scheduler. A remaining frame period in the frame may be determined, and the dynamic tasks may be executed in the remaining frame period. The remaining frame period is a time period after executing the fixed jobs in the frame and at a frame boundary of the frame.

Execution times of fixed and dynamic jobs may vary. For example, an amount of time left after the fixed tasks have executed may vary dramatically between frame periods. Accordingly, the amount of time in which dynamic jobs may be executed in a remaining frame period may vary dramatically from frame to frame. For example, a first frame may have 10 milliseconds remaining after the fixed jobs execute and a second frame may have 2 milliseconds remaining after the fixed jobs execute. When control is given to the scheduler, the scheduler may run through a scheduling queue and identify jobs that are predicted to execute and finish before the frame boundary. If the scheduler is incorrect in its prediction, the frame deadline is missed and the frame.

1. Single-Active Sporadic Tasks and Soft Real-Time Aperiodic Tasks

Referring back to FIG. 3, a visibility computation, fetch 1, fetch 2, and road drawing dynamic tasks are shown. The visibility computation and road drawing tasks are single-active sporadic tasks and the fetch 1 and fetch 2 tasks are soft real-time aperiodic tasks.

Dynamic tasks may be of different types. A first type of dynamic task is a single-active sporadic task and a second type of dynamic task is a soft teal-time aperiodic task. A single-active sporadic task has one job released in each frame (e.g., vertical synchronization time) unless another job of the task has been released in a previous frame but has not yet completed. A single-active sporadic task releases a job once per frame whenever possible. Releasing only one job that has not yet completed is a simple form of adaptability that limits the system load. More complex adaptively schemes exist, which is known by a person of ordinary skill in the relevant art. The soft deadline of each job is defined to be the next vertical synchronization time. In an embodiment, each job has a perceived response time of one frame and a job is released at each vertical synchronization time. An example of a single-active sporadic task is a task that redraws on-screen imagery.

In contrast to a single-active sporadic task that may release one job per frame, a soft real-time aperiodic task has jobs released in response to input/output events, such as receiving new imagery over the network. Because large amounts of data may be requested at the same time and network behavior is somewhat unpredictable, no constraints may exist on the release times of such tasks. New data usually indicates that the view on the screen is out of date. Therefore, each job also may have a soft deadline at the next vertical synchronization time after it is released. These jobs may be modeled as soft real-time aperiodic jobs without reference to tasks. A soft real-time aperiodic job can be cancelled if the application determines that it is no longer relevant. For example, a network response with details about a three-dimensional building that is no longer in view does not need to be processed.

Further, the vertical synchronization operation can be modeled as a periodic task with an execution time of $\epsilon$ (for an arbitrarily small $\epsilon$) and a frame period of 16.67 milliseconds with a firm deadline at the vertical synchronization time and released $\epsilon$ units before. It may be desirable to ensure that no other job is running when the deadline occurs.

2. Update a View of a Geographic Information Environment

As described above, an example of a dynamic task is updating a view of a geographic information environment. Updating a view may include executing numerous jobs. Jobs typically arrive in bursts. For example, when a user changes the view location, numerous jobs to load and render the new scene are released at the same time. A virtual camera defines a perspective to view content of the three-dimensional environment. A frame representing the updated view is based on a position of the virtual camera. A view may be updated when a user moves a virtual camera.

Based on the position of the virtual camera, a visibility computation task may create a list of visible regions and compare the list of visible regions to the existing regions. In FIG. 3, a remaining frame period may be determined in Frame 1. The remaining frame period may be a time period after executing the set of fixed jobs in Frame 1 and at a frame boundary of Frame 1. The visibility computation task includes two preemption points that may be used to determine whether the visibility computation task should continue to execute in Frame 1. In subsequent Frame 25, the visibility computation task misses its deadline at the end of Frame 25. Accordingly, the visibility computation task does not release a new job for Frame 26.

After the visibility computation task finishes executing in Frame 1, an updated remaining frame period in Frame 1 can be determined. The updated remaining frame period may be a time period after executing the visibility computation task in Frame 1 and at a frame boundary of Frame 1. Other dynamic tasks may be executed in the updated remaining frame period. For example, in FIG. 3, a road drawing task is executed in Frame 1 after the visibility computation task completes.

If the regions are not currently loaded or are at a different resolution, a set of fetches is queued up to request the needed regions. For example, if the needed imagery tiles are not currently loaded and the needed terrain tiles are not at the right resolution, the needed imagery tiles and terrain tiles are requested and fetched from the server. When the server responds to these requests, the needed regions are processed.

In FIG. 3, the fetch 1 and fetch 2 tasks may include processing the needed regions. Processing this data may include decoding data, loading the data into data structures, loading the data into graphic memory, storing the data in a cache, and updating the data structures. This new data can cause a number of other data structures to be updated by sporadic tasks. For example, when higher resolution terrain data is fetched, other tasks may update themselves. For example, higher resolution terrain data may cause the altitudes of road segments to be updated based on the new terrain data. If the road segment altitudes are not updated, the road segments would appear on the old terrain, resulting in a distorted view. The road drawing task may require more work when new data has been processed.

In contrast to the high data processing that occurs when a virtual camera is moved, when a virtual camera remains still, all the data needed for rendering the frame is present and no new data is fetched. Accordingly, a small amount of time may elapse as a result of this update since no fetching occurs.

In Frames 1, 25, and 26, an end of each frame period may remain idle to avoid executing jobs that are predicted to miss the firm vertical synchronization deadline.

C. Vertical Synchronization

In a third stage of the frame, a vertical synchronization occurs. When a job finishes before the vertical synchronization deadline, frame stutters may be reduced. A job's perceived response time is the number of complete or partial frame periods between a job's release and the next successful vertical synchronization after the job's completion. For example, if a job is released and completes in between two vertical synchronization signals and the second vertical synchronization is successful, the response time of the job is one frame period. It may be desirable for a job's perceived response time to be as short as possible. From a user's perspective, a job's completion is not visible until the next successful vertical synchronization. If the update rate of the display device is set to 60 Hertz, the user typically experiences content being displayed quickly and smoothly when 60 frames per second are rendered on the display device. The frame has a vertical synchronization deadline of 60 frames per second. If it takes longer than 60 frames per second, the frame stutters and the user may see the same frame rendered twice.

A visible stutter is more noticeable to the user than a delay of a few seconds. Therefore, avoiding a vertical synchronization miss is generally a higher priority than achieving a small perceived response time.

VI. Exemplary System Architecture

Figure 4:
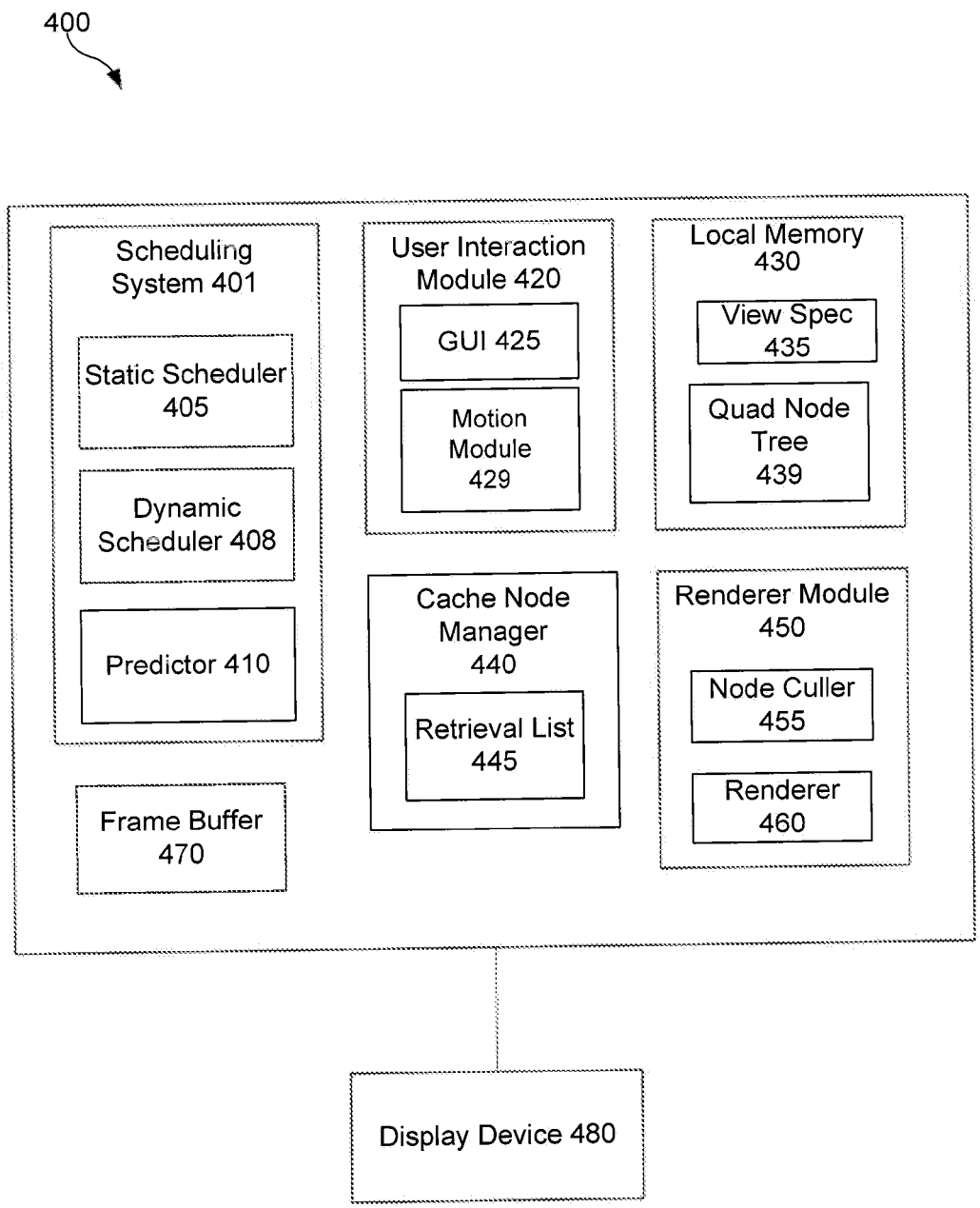
FIG. 4 shows an exemplary architecture diagram of an exemplary client of a GIS.

FIG. 4 shows an exemplary architecture diagram of an exemplary client 400 of a GIS. In an embodiment, client 400 includes a scheduling system 401, user interaction module 420, local memory 430, cache node manager 440, renderer module 450, frame buffer 470, and display device 480.

In an embodiment, the components of client 400 can be implemented, for example, as software running on a client machine. Client 400 interacts with a GIS server (not shown) to bring images of the Earth and other geospatial data to client 400 for viewing by a user. Together, the images of the Earth and other geospatial data form a three-dimensional model in a three-dimensional environment. In an embodiment, software objects are grouped according to functions that can run asynchronously (e.g., time independently) from one another.

A. Scheduling System

Scheduling system 401 schedules jobs for execution and executes the jobs in frames representing views of a geographic information environment. Scheduling system 401 includes a static scheduler 405, dynamic scheduler 408, and predictor 410. Static scheduler 405 may execute fixed jobs.

Dynamic scheduler 408 may schedule and execute dynamic jobs in a scheduling queue. Dynamic scheduler 408 may determine a first remaining frame period in a frame representing a view of the geographic information environment. The first remaining frame period is a time period after the fixed jobs are executed in the frame and at a frame boundary of the frame. Dynamic scheduler 408 may identify a dynamic job in a scheduling queue. The dynamic job may have a non-preemptive section that is between a start of the job and a first preemption point of the job.

Predictor 410 may determine a first estimated execution time for executing the job. In an embodiment, predictor 410 may determine a first estimated execution time for executing the job based at least in part on past behavior of the job, an estimated execution time for executing the initial non-preemptive section of the job, a task identifier of the job, a type of the non-preemptive section of the job, or a section length of at least one non-preemptive section of the job (e.g., a longest section length of a non-preemptive section of the job).

1. Estimated Execution Time is not Greater Than the Remaining Frame Period

Predictor 410 may determine an estimated execution time at runtime. When the first estimated execution time is not greater than the first remaining frame period, dynamic scheduler 408 may execute the non-preemptive section of the job in the frame. Dynamic scheduler 408 may determine a second remaining frame period in the frame after executing the non-preemptive section of the job. The second remaining frame period is a time period after executing the non-preemptive section of the job and at the frame boundary of the frame.

Dynamic scheduler 408 may determine whether the job has a subsequent non-preemptive section. The subsequent non-preemptive section may be between the first preemption point of the first job and a subsequent preemption point of the first job or between the first preemption point of the first job and an end of the first job.

If the job has a subsequent non-preemptive section, predictor 410 may determine a second estimated execution time for executing the first job. When the second estimated execution time is not greater than the second remaining frame period, dynamic scheduler 408 may execute the subsequent non-preemptive section of the first job in the first frame. When the second estimated execution time is greater than the second remaining frame period, dynamic scheduler 408 may postpone the execution of the first job at the first preemption point.

2. Estimated Execution Time is Greater than the Remaining Frame Period

When the first estimated execution time is greater than the first remaining frame period, dynamic scheduler 408 may identify a second dynamic job in the scheduling queue for potential execution. The second dynamic job has an initial non-preemptive section that is between a start of the second job and a first preemption point of the second job.

Predictor 410 may determine a second estimated execution time for executing the non-preemptive section of the second job. When the second estimated execution time is not greater than the first remaining frame period, dynamic scheduler 408 may execute the second job in the first frame. When the second estimated execution time is greater than the first remaining frame period, dynamic scheduler 408 may postpone the execution of the second job in the first frame. Dynamic scheduler 408 may proceed to identify another job in the scheduling queue for potential execution and continue this process.

Each image rendered at display device 480 is called a frame. The data to be rendered to a user may be placed in frame buffer 470. A vertical synchronization event occurs when display device 480 reads data from frame buffer 470. This read is synchronized to the update rate of display device 480.

B. Scheduling Tasks in a Geographic Information Environment

User interaction module 420, local memory 430, cache node manager 440, and renderer module 450 are tasks that may schedule jobs to be executed and load the jobs in a scheduling queue. Scheduling system 401 controls the execution of jobs in the scheduling queue. If time remains after a fixed set of jobs is executed, dynamic scheduler 108 looks in a scheduling queue and identifies potential jobs to execute.

In an embodiment, client 400 operates as follows. User interaction module 420 includes a graphical user interface (GUI) 425 and motion module 429. Local memory 430 includes a view specification 435 and quad node tree 439. User interaction module 420 receives user input regarding a location that a user desires to view and, through motion module 429, constructs view specification 435. A user may input location information using GUI 425. This results, for example, in the generation of view specification 435. View specification 435 defines a virtual camera's viewable volume within a three-dimensional space, known as a frustum, and the position and orientation of the frustum with respect, for example, to a three-dimensional map. View specification 435 is placed in local memory 430, where it is used by renderer module 450. In an embodiment, renderer module 450 uses view specification 435 to render data for display.

In an embodiment, cache node manager 440 builds a quad node tree 439 by populating it with quad nodes based on view specification 435. In an embodiment, cache node manager 440 identifies which cache nodes are needed from the server to resolve a review and requests these cache nodes. Cache node manager 440 includes a retrieval list 445 that includes a list of information identifying cache nodes to be requested and downloaded from a GIS server. Cache node manager 440 builds quad node tree 439 in local memory 430 by populating it with quad nodes retrieved from GIS server(s).

In an embodiment, static scheduler 405 executes fixed jobs associated with these tasks. The tasks may release jobs into a scheduling queue, and dynamic scheduler 408 may schedule and execute dynamic jobs in the scheduling queue.

Figure 5:
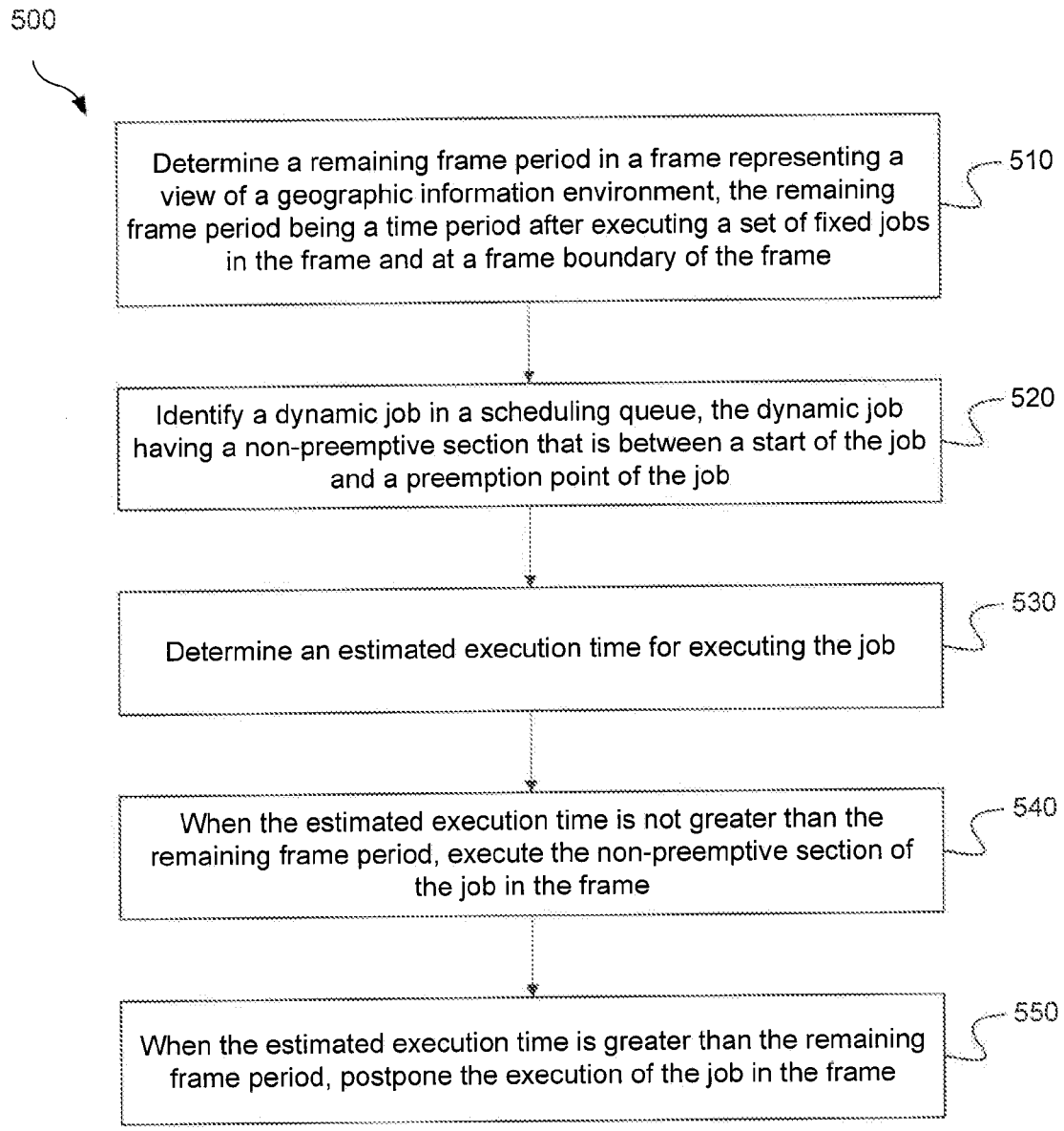
FIG. 5 shows a flowchart of an exemplary method for scheduling and executing jobs in frames representing views of a geographic information environment, according to an embodiment.

V. Exemplary Method For Scheduling Jobs in Frames Representing Views of a Geographic Information Environment FIG. 5 shows a flowchart 500 of an exemplary method for scheduling and executing jobs in frames representing views of a geographic information environment, according to an embodiment.

At a stage 510, a remaining frame period in a frame representing a view of a geographic information environment is determined, the remaining frame period being a time period after executing a set of fixed jobs in the frame and at a frame boundary of the frame. For example, dynamic scheduler 408 may determine a remaining frame period in a frame representing a view of the geographic information environment, the remaining frame period being a time period after executing a set of fixed jobs in the frame and at a frame boundary of the frame.

At a stage 520, a dynamic job in a scheduling queue is identified, the dynamic job having a non-preemptive section that is between a start of the job and a preemption point of the job. For example, dynamic scheduler 408 may identify a dynamic job in a scheduling queue, the dynamic job having a non-preemptive section that is between a start of the job and a preemption point of the job.

At a stage 530, an estimated execution time is determined for executing the job. For example, predictor 410 may determine an estimated execution time for executing the job.

At a stage 540, when the estimated execution time is not greater than the remaining frame period, the non-preemptive section of the job is executed in the frame. For example, dynamic scheduler 408 may when the estimated execution time is not greater than the remaining frame period, execute the non-preemptive section of the job in the frame.

At a stage 550, when the estimated execution time is greater than the remaining frame period, the execution of the job in the frame is postponed. For example, dynamic scheduler 408 may when the estimated execution time is greater than the remaining frame period, postpone the execution of the job in the frame.

VI. Scheduling

A. Scheduling Queue

The order in which jobs in a scheduling queue are executed may be flexible and determined by a scheduler. The scheduler may schedule dynamic jobs for execution and then execute the dynamic jobs in an appropriate order. Scheduling the dynamic jobs in an appropriate order to be executed in a frame may reduce frame stutter.

In an embodiment, the scheduling queue is a priority scheduling queue that includes jobs having priority identifiers. If a postponed job is very long and there are multiple short jobs in the scheduling queue, the postponed job may continuously be postponed with a potential for starvation. To prevent starvation of jobs that have long predicted runtimes, a scheduler may execute the highest-priority job in a frame. The scheduler may continue executing the job even when it is predicted to exceed a frame boundary instead of executing remaining short-running jobs that are not predicted to exceed the frame boundary.

Jobs may be executed according to a first-in-first out (FIFO) priority, with each job that is predicted to exceed a frame boundary being deferred to the next frame period without changing the job's priority identifier. In this example, the older a job is, the higher the relative priority of the job may be.

B. Example Scheduling Interface

FIG. 6 shows exemplary code for a scheduling interface IJobScheduler. In an embodiment, the scheduler is a uniprocessor scheduler. For example, a scheduling interface IJobScheduler may schedule tasks only on a main thread at an end of a frame. In another embodiment, the scheduler is a multiprocessor scheduler. For example, an interface IJobScheduler may schedule tasks on a main thread at an end of a frame and may also schedule worker-thread jobs.

In an embodiment, the scheduler repeatedly calls certain functions based on scheduling constraints. Each called function may constitute a task, and each call to the function may be a job. When a job makes its own function calls, these can be considered part of the job rather than a separate job. Within each scheduled task, a job is a single function call from the scheduler.

The interface IJobScheduler may include a mechanism to safely stop a job and give control to the scheduler. For example, when a job can safely be stopped, the job can call a function ShouldContinue( ) on the scheduler. The call to function ShouldContinue( ) may optionally include an estimated execution time for how much time the job expects to run before it next calls ShouldContinue( ) or completes. The scheduler may determine whether to continue the execution of the job or to postpone the execution of the job. The scheduler may base its decision at least in part on the estimated execution time. The scheduler may return its decision to the job.

A scheduler may contain a pluggable interface for determining an estimated execution time for executing a job. An appropriate time prediction function can be selected to improve performance. Deadline misses may compete against perceived response time of a job. For example, if the scheduler is too optimistic, a large number of deadline misses may result. Deadline misses may increase perceived response time because jobs that complete after the deadline will not have their effects observed until the next successful vertical synchronization. If the scheduler is too pessimistic, however, large perceived response times may result because jobs are deferred to later frame periods.

C. Estimate Execution Time

Execution time may be predicted in a variety of ways. For example, an estimated execution time of a job may be based at least in part on past behavior of the job, a task identifier of the job, a type of the non-preemptive section of the job, an execution time of a non-preemptive section of the job, or a section length of the non-preemptive section(s) of the first, (e.g., longest non-preemptive section of a job). The estimated execution time may be determined at runtime.

A scheduler may support receiving an estimated execution time for executing a job from the job. Even if the job provides an estimated execution time for executing the job, the scheduler may continue to determine an estimated execution time for executing the job. The scheduler may then compare the two estimated execution times and select the most pessimistic result. Based on this result, the scheduler may determine whether to execute the job in a frame or postpone the job from executing in the frame.

In an embodiment, an estimated execution time for executing a job may be based at least in part on a point in the job at which execution starts or resumes. For example, a different code path is likely to run at the beginning of a job than when it executes a non-preemptive section after a call to ShouldContinue( ). Accordingly, timing statistics for these two cases may be handled separately. Furthermore, code paths between different calls to ShouldContinue( ) may differ. In an embodiment, the worst observed non-preemptive section time for each job after a call to ShouldContinue( ) is used as the metric for the non-preemptive sections that follow a call to ShouldContinue( ).

In an embodiment, one predictor is created for each set of jobs that share a single task identifier. All predictors may be of the same type as each other. For sporadic tasks, each task identifier corresponds to an actual task. Multiple aperiodic tasks executing the same code path may be assigned the same task identifier as each other to capture a useful behavior history.

In an embodiment, an estimated execution time of 0 is estimated for each non-preemptive section of a job. As such, when a deadline has actually been missed or when a job provides an estimated execution time for the job, it may be prevented from execution based on timing. Further, the scheduler may stop job execution as soon as the scheduler predicts that a non-preemptive section of a job will not finish before the frame boundary. These measurements may be used as a baseline.

In an embodiment, a maximum observed execution time for each type of non-preemptive section is used as the estimated execution time for the job. This may be used for a worst-case execution time estimate and may be sensitive to outliers. For example, if the operating system decides to preempt the geographic application during the execution of a job, the measured non-preemptive section length could be very large. Pessimistically assuming that all jobs of the same task can require such a large amount of execution time could result in large delays and a large perceived response time for such jobs. To limit this effect, measured values may expire. For example, the worst observed response time over the past six seconds may be used instead of since the start of the geographic application.

In an embodiment, a histogram of past non-preemptive section times is stored. This may control the probability of incorrectly predicting a value. In an embodiment, a bin size of $10^{-3}$ milliseconds is used and a configurable percentile of the histogram may be selected. For example, if a 95% histogram is used, the leftmost 95% of values may be selected, and the maximum value in the appropriate bin range may be used as an execution time estimator. Maintaining the histogram may result in outliers being handled robustly.

In an embodiment, the mean and standard deviation values of a job's non-preemptive section lengths are measured. This can be performed for each type of non-preemptive section (e.g., initial non-preemptive section and post-preemption point non-preemptive section). These values may be measured online even if the true mean and variance are unknown. Using only the mean value of a job's non-preemptive section length to estimate an execution time may result in under-predicting the execution time half of the time. By using the mean value plus a certain number (e.g., configurable number) of standard deviations, an estimated execution time can be determined with similar pessimism to the execution histogram. This may reduce the overhead.

Figure 7:
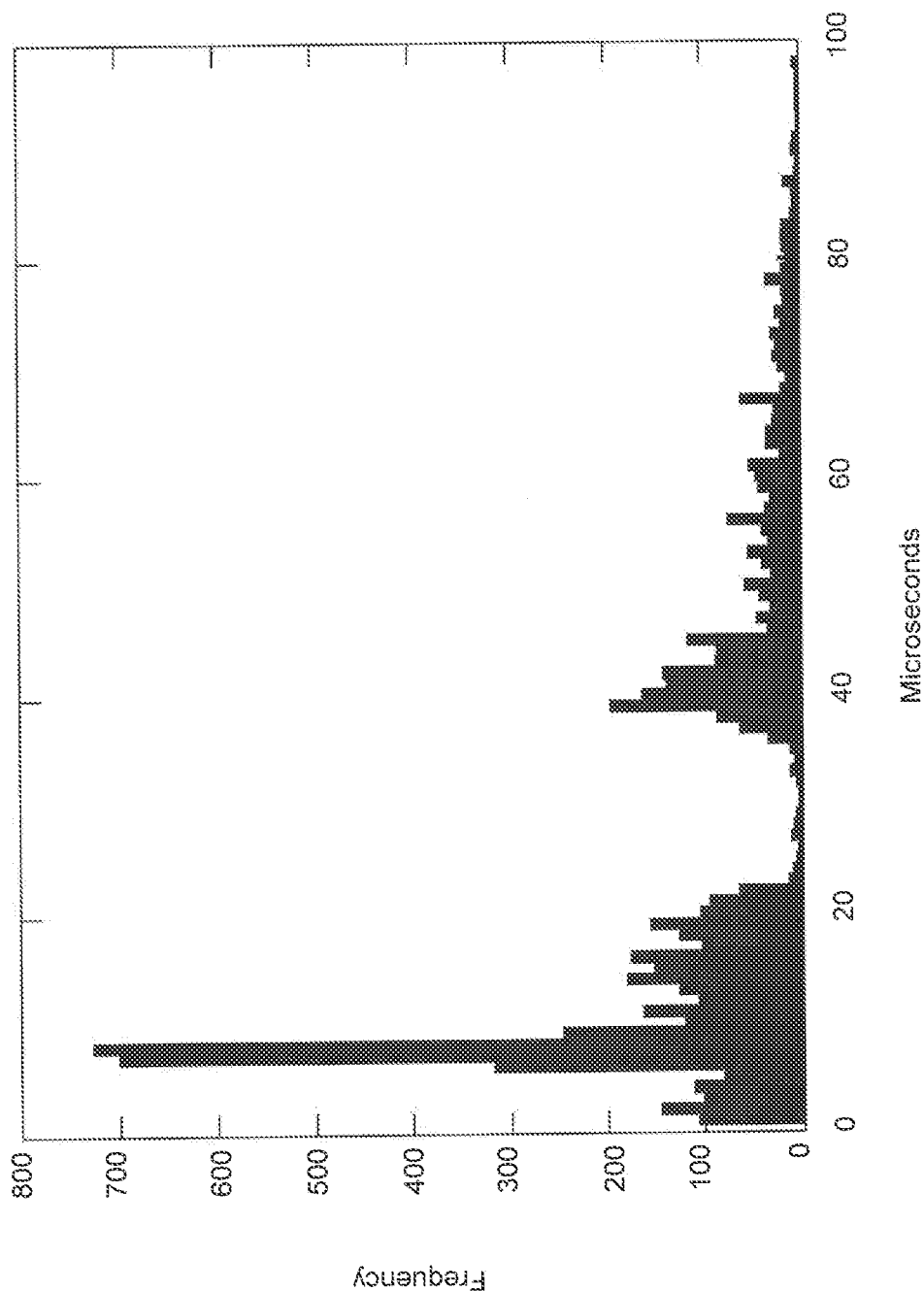
FIG. 7 shows a partial execution histogram for a job with no preemption points, according to an embodiment.

FIG. 7 shows a partial execution histogram for a job with no preemption points, according to an embodiment. The execution times have a wide spread and a heavy tail. In FIG. 7, the longest observed worst case for this job is 15 milliseconds but an average case is an order of magnitude lower.

FIG. 8 shows a perceived response histogram, according to an embodiment. The perceived response histogram may be a typical perceived response time histogram. This histogram has variances in the length of the tail.

FIG. 9 shows a table of techniques used to estimate the execution time of jobs, according to an embodiment. The table includes data such as the platform used, missed firm deadline, worst median (within task) response, average response time, and worst response time associated with the executed job.

Figure 10:
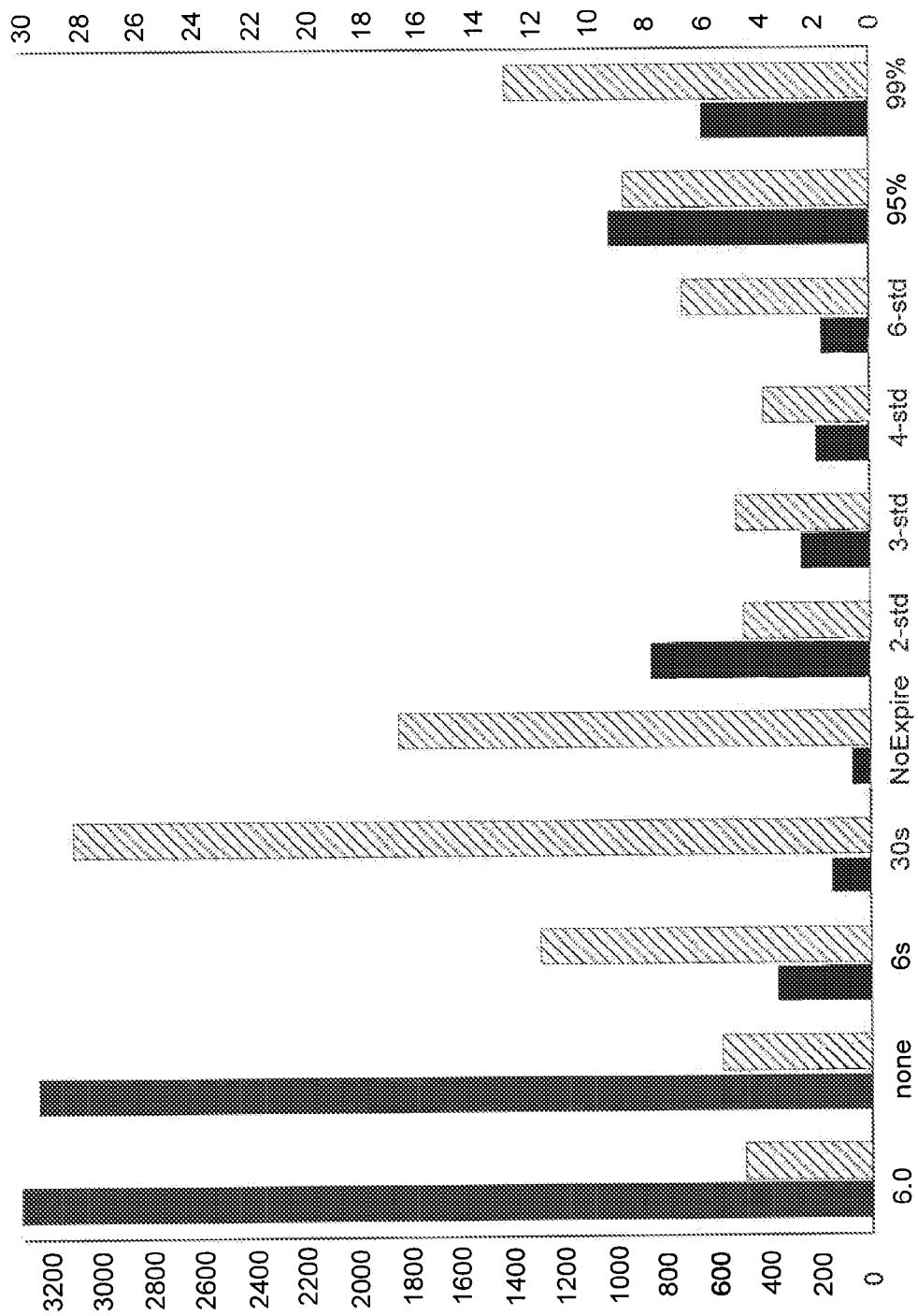
FIG. 10 shows a graph illustrating the tradeoff between the missed film deadlines and average response times for different time predictors, according to an embodiment.

FIG. 10 shows a graph illustrating the tradeoff between the missed firm deadlines (dark bars) and average response times (striped bars) for different time predictors, according to an embodiment. The graph is created from the third and fifth columns of the table in FIG. 9. The 6.0 predictor has a fast response time but may cause a lot of stutter. As shown in FIG. 10, other predictors, such as NoExpire, rarely miss a frame at the cost of large response times. A healthy balance may be achieved by using Mean or Histogram prediction.

VII. Conclusion

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method for scheduling jobs in frames representing views of geographic information environments, comprising:

determining, by one or more computing devices, a first remaining frame period in a first frame representing a first view of a geographic information environment, the first remaining frame period being a time period after executing a first set of fixed jobs in the first frame and at a frame boundary of the first frame;

identifying, by the one or more computing devices, a first dynamic job in a scheduling queue, the first dynamic job having a first non-preemptive section that is between a start of the first dynamic job and a first preemption point of the first dynamic job;

determining, by the one or more computing devices, a first estimated execution time for executing the first dynamic job;

when the first estimated execution time is not greater than the first remaining frame period, executing, by the one or more computing devices, the first non-preemptive section of the first dynamic job in the first frame; and when the first estimated execution time is greater than the first remaining frame period, postponing, by the one or more computing devices, the execution of the first dynamic job in the first frame.

2. The method of claim 1, wherein postponing the execution of the first dynamic job in the first frame comprises executing the first dynamic job in a next frame.

3. The method of claim 1, further comprising:
when the first estimated execution time is not greater than the first remaining frame period, determining, by the one or more computing devices, a second remaining frame period in the first frame, the second remaining frame period being a time period after executing the first non-preemptive section of the first dynamic job and at the frame boundary of the first frame;
determining by the one or more computing devices, whether the first dynamic job has a second non-preemptive section that is between the first preemption point of the first dynamic job and a subsequent preemption point of the first dynamic job;
determining, by the one or more computing devices, a second estimated execution time for executing the first dynamic job;
when the second estimated execution time is not greater than the second remaining frame period, executing, by the one or more computing devices, the second non-preemptive section of the first dynamic job in the first frame; and
when the second estimated execution time is greater than the second remaining frame period, postponing, by the one or more computing devices, the execution of the first dynamic job at the first preemption point.

4. The method of claim 1, further comprising:
when the first estimated execution time is not greater than the first remaining frame period, determining, by the one or more computing devices., a second remaining frame period in the first frame, the second remaining frame period being a time period after executing the first non-preemptive section of the first dynamic job and at the frame boundary of the first frame;
determining, by the one or more computing devices, whether the first dynamic job has a second non-preemptive section that is between the first preemption point of the first dynamic job and an end of the first dynamic job, wherein the first dynamic job has one preemption point;
determining, by the one or more computing devices, a second estimated execution time for executing the first dynamic job;
when the second estimated execution time is not greater than the second remaining frame period, executing, by the one or more computing devices, the second non-preemptive section of the first dynamic job in the first frame; and
when the second estimated execution time is greater than the second remaining frame period, postponing, by the one or more computing devices, the execution of the first dynamic job at the first preemption point.

5. The method of claim 1, further comprising:
when the first estimated execution time is greater than the first remaining frame period, identifying the one or more computing devices, a second dynamic job in the scheduling queue, the second dynamic job having a second non-preemptive section that is between a start of the second dynamic job and a first preemption point of the second dynamic job;
determining by the one or more computing devices, a second estimated execution time for executing the second dynamic job;
when the second estimated execution time is not greater than the first remaining frame period, executing, by the one or more computing devices, the second non-preemptive section of the second dynamic job in the first frame; and
when the second estimated execution time is greater than the first remaining frame period, postponing, by the one or more computing devices, the execution of the second dynamic job in the first frame.

6. The method of claim 1, further comprising:
executing, by the one or more computing devices, a second set of fixed jobs in a second frame representing a second view of the geographic information environment; and
when the first estimated execution time is greater than the first remaining frame period and after executing the second set of fixed jobs, executing , by the one or more computing devices, the first non-preemptive section of the first dynamic job in the second frame.

7. The method of claim 1, further comprising
determining, by the one or more computing devices, whether the execution of the first dynamic job has exceeded the frame boundary of the first frame; and
when it is determined that the execution of the first dynamic job has exceeded the frame boundary, halting, by the one or more computing devices, the execution of the first dynamic job.

8. The method of claim 1, wherein determining the first estimated execution time is based at least in part on past behavior.

9. The method of claim 1, wherein the first estimated execution time is determined at runtime.

10. The method of claim 1, wherein the first estimated execution time is based in part on at least one of a task identifier of the first dynamic job, a type of the first non-preemptive section of the first dynamic job, or a section length of at least one non-preemptive section of the first dynamic job.

11. A system for scheduling jobs in frames representing views of geographic information environments, comprising:
a computing device including one or more processors and associated memory, the memory storing instructions that, when implemented by the one or more processors, provide for the computing device to implement:
(a) a scheduler that:
(i) determines a first remaining frame period in a first frame representing a first view of a geographic information environment, the first remaining frame period being a time period after executing a first set of fixed jobs in the first frame and at a frame boundary of the first frame;
(ii) identifies a first dynamic job in a scheduling queue, the first dynamic job having a first non-preemptive section that is between a start of the first dynamic job and a first preemption point of the first dynamic job;
(iii) when a first estimated execution time is not greater than the first remaining frame period, executes the first non-preemptive section of the first dynamic job in the first frame; and (iv) when the first estimated execution time is greater than the first remaining frame period, postpones the execution of the first dynamic job in the first frame; and (b) a predictor that determines the first estimated execution time for executing the first dynamic job.

12. The system of claim 11, wherein the instructions further provide for the computing device to implement the scheduler such that the scheduler:

(v) when the first estimated execution time is not greater than the first remaining frame period, determines a second remaining frame period in the first frame, the second remaining frame period being a time period after executing the first non-preemptive section of the first dynamic job and at the frame boundary of the first frame;

(vi) determines whether the first dynamic job has a second non-preemptive section that is between the first preemption point of the first dynamic job and a subsequent preemption point of the first dynamic job;

(vii) when a second estimated execution time is not greater than the second remaining frame period, executes the second non-preemptive section of the first dynamic job in the first frame; and (viii) when the second estimated execution time is greater than the second remaining frame period, postpones the execution of the first dynamic job at the first preemption point; and wherein the instructions further provide for the computing device to implement the predictor such that the predictor determines the second estimated execution time for executing the first dynamic job.

13. The system of claim 11, wherein the instructions further provide for the computing device to implement the scheduler such that the scheduler:

(v) when the first estimated execution time is not greater than the first remaining frame period, determines a second remaining frame period in the first frame, the second remaining frame period being a time period after executing the first non-preemptive section of the first dynamic job and at the frame boundary of the first frame;

(vi) determines whether the first dynamic job has a second non-preemptive section that is between the first preemption point of the first dynamic job and an end of the first dynamic job, wherein, the first dynamic job has one preemption point;

(vii) when a second estimated execution time is not greater than the second remaining frame period, executes the second non-preemptive section of the first dynamic job in the first frame; and (viii) when the second estimated execution time is greater than the second remaining frame period, postpones the execution of the first dynamic job at the first preemption point; and wherein the instructions further provide for the computing device to implement the predictor such that the predictor determines the second estimated execution time for executing the first dynamic job.

14. The system of claim 11, wherein the instructions further provide for the computing device to implement the scheduler such that the scheduler:

(v) when the first estimated execution time is greater than the first remaining frame period, identifies a second dynamic job in the scheduling queue, the second dynamic job having a second non-preemptive section that is between a start of the second dynamic job and a first preemption point of the second dynamic job;

(vi) when a second estimated execution time is not greater than the first remaining frame period, executes the second non-preemptive section of the second dynamic job in the first frame; and (vii) when the second estimated execution time is greater than the first remaining frame period, postpones the execution of the second dynamic job in the first frame; and wherein the instructions further provide for the computing device to implement the predictor such that the predictor determines the second estimated execution time for executing the second dynamic job.

15. The system of claim 11, wherein the instructions further provide for the computing device to implement the scheduler such that the scheduler:

(v) executes a second set of fixed jobs in a second frame representing a second view of the geographic information environment; and (vi) when the first estimated execution time is greater than the first remaining frame period and after executing the second set of fixed jobs, execute the first non-preemptive section of the first dynamic job in the second frame.

16. The system of claim 11, wherein the instructions further provide for the computing device to implement the scheduler such that the scheduler:

(v) determines whether the execution of the first dynamic job has exceeded the frame boundary of the first frame; and (vi) when it is determined that the execution of the first dynamic job has exceeded the frame boundary, halts the execution of the first dynamic job.

17. The system of claim 11, wherein the instructions further provide for the computing device to implement the predictor such that the predictor determines the first estimated execution time based at least in part on past behavior.

18. The system of claim 11, wherein the instructions further provide for the computing device to implement the predictor such that the predictor determines the first estimated execution time at runtime.

19. The system of claim 11, wherein the instructions further provide for the computing device to implement the predictor such that the predictor determines the first estimated execution time based in part on at least one of a task identifier of the first dynamic job, a type of the first non-preemptive section of the first dynamic job, or a section length of at least one non-preemptive section of the first dynamic job.

20. The system of claim 11, wherein the scheduler is a uniprocessor scheduler.

21. The system of claim 11, wherein the scheduler is a multiprocessor scheduler.

22. An apparatus comprising at least one non transitory computer readable storage medium encoding instructions thereon that, in response to execution by a computing device, cause the computing device to perform operations comprising:

determining a first remaining frame period in a first frame representing a first view of the geographic information environment, the first remaining frame period being a time period after executing a first set of fixed jobs in the first frame and at a frame boundary of the first frame;

identifying a first dynamic job in a scheduling queue, the first dynamic job having a first non-preemptive section that is between a start of the first dynamic job and a first preemption point of the first dynamic job;

determining a first estimated execution time for executing the first dynamic job;

when the first estimated execution time is not greater than the first remaining frame period, executing the first non-preemptive section of the first dynamic job in the first frame; and when the first estimated execution time is greater than the first remaining frame period, postponing the execution of the first dynamic job in the first frame.

23. The apparatus of claim 22, wherein the operations further comprise:

when the first estimated execution time is not greater than the first remaining frame period, determining a second remaining frame period in the first frame, the second remaining frame period being a time period after executing the first non-preemptive section of the first dynamic job and at the frame boundary of the first frame;

determining whether the first dynamic job has a second non-preemptive section that is between the first preemption point of the first dynamic job and a subsequent preemption point of the first dynamic job;

determining a second estimated execution time for executing he first dynamic job;

when the second estimated execution time is not greater than the second remaining frame period, executing the second non-preemptive section of the first dynamic job in the first frame; and when the second estimated execution time is greater than the second remaining frame period, postponing the execution of the first dynamic job at the first preemption point.

24. The apparatus of claim 22, wherein the operations further comprise when the first estimated execution time is not greater than the first remaining frame period, determining a second remaining frame period in the first frame, the second remaining frame period being a time period after executing the first non-preemptive section of the first dynamic job and at the frame boundary of the first frame;

determining whether the first dynamic job has a second non preemptive section that is between the first preemption point of the first dynamic job and an end of the first dynamic job, wherein the first dynamic job has one preemption point;

determining a second estimated execution time for executing the first dynamic job;

when the second estimated execution time is not greater than the second remaining frame period, executing the second non preemptive section of the first dynamic job in the first frame; and when the second estimated execution time is greater than the second remaining frame period, postponing the execution of the first dynamic job at the first preemption point.

25. The apparatus of claim 22, wherein the operations further comprise:

when the first estimated execution time is greater than the first remaining frame period, identifying a second dynamic job in the scheduling queue, the second dynamic job having a second non-preemptive section that is between a start of the second dynamic job and a first preemption point of the second dynamic job;

determining a second estimated execution time for executing the second dynamic job;

when the second estimated execution time is not greater than the first remaining frame period, executing the second non preemptive section of the second dynamic job in the first frame; and when the second estimated execution time is greater than the first remaining frame period, postponing the execution of the second dynamic job in the first frame.

* * * * *